(12) United States Patent
Reed

(10) Patent No.: US 11,732,429 B2
(45) Date of Patent: Aug. 22, 2023

(54) FOLDING SNOW SHOVEL WITH IMPROVED JOINT

(71) Applicant: HOPKINS MANUFACTURING CORPORATION, Emporia, KS (US)

(72) Inventor: Scott Reed, Emporia, KS (US)

(73) Assignee: HOPKINS MANUFACTURING CORPORATION, Emporia, KS (US)

( * ) Notice: Subject to any disclaimer, the term of this patent is extended or adjusted under 35 U.S.C. 154(b) by 180 days.

(21) Appl. No.: 17/231,154

(22) Filed: Apr. 15, 2021

(65) Prior Publication Data

US 2022/0333324 A1    Oct. 20, 2022

(51) Int. Cl.
*A01B 1/02* (2006.01)
*E01H 5/02* (2006.01)

(52) U.S. Cl.
CPC .............. *E01H 5/02* (2013.01); *A01B 1/022* (2013.01)

(58) Field of Classification Search
CPC .......... A01B 1/022; A01B 1/225; E01H 5/02; B25G 3/38; B25G 1/04; B25G 1/06; F16C 11/10
USPC ........................................ 294/51, 53.5, 54.5
See application file for complete search history.

(56) References Cited

U.S. PATENT DOCUMENTS

| | | | |
|---|---|---|---|
| 881,782 A * | 3/1908 | Elliott | |
| 1,654,958 A * | 1/1928 | Breton | B25G 1/06 403/100 |
| 4,848,818 A * | 7/1989 | Smith | E04D 13/0765 294/181 |
| 5,123,768 A * | 6/1992 | Franklin | F16C 11/10 403/96 |
| 5,765,958 A * | 6/1998 | Lan | F16C 11/10 403/93 |
| 5,810,408 A * | 9/1998 | Armstrong | B25G 1/06 294/51 |
| 6,625,837 B2 * | 9/2003 | Jiang | B25G 1/06 15/105 |
| 7,946,637 B1 * | 5/2011 | Gehman | E01H 5/02 294/51 |
| 8,132,978 B2 * | 3/2012 | Franklin | F16C 11/10 403/96 |
| 9,427,862 B1 * | 8/2016 | Durfee, Jr. | B25G 3/38 |
| 10,047,789 B1 * | 8/2018 | Mosby | F16C 11/10 |
| 2008/0185857 A1 * | 8/2008 | Westgarde | E01H 5/02 294/54.5 |

* cited by examiner

*Primary Examiner* — Dean J Kramer
(74) *Attorney, Agent, or Firm* — Hovey Williams LLP

(57) ABSTRACT

A joint connects a first portion of a tool to a second portion of the tool. The joint comprises a first elongated portion, a second elongated portion, and a hub. The first elongated portion is configured to couple to the first portion of the tool and includes a first joint end. The second elongated portion is configured to couple to the second portion of the tool and includes a second joint end with a plurality of cavities formed therein. The hub is positioned between the first joint end and the second joint end and is shiftable between a locked position and an unlocked position. The hub includes a projection that is operable to extend into one of the cavities when in the locked position and shift out of the cavities when in the unlocked position.

18 Claims, 12 Drawing Sheets

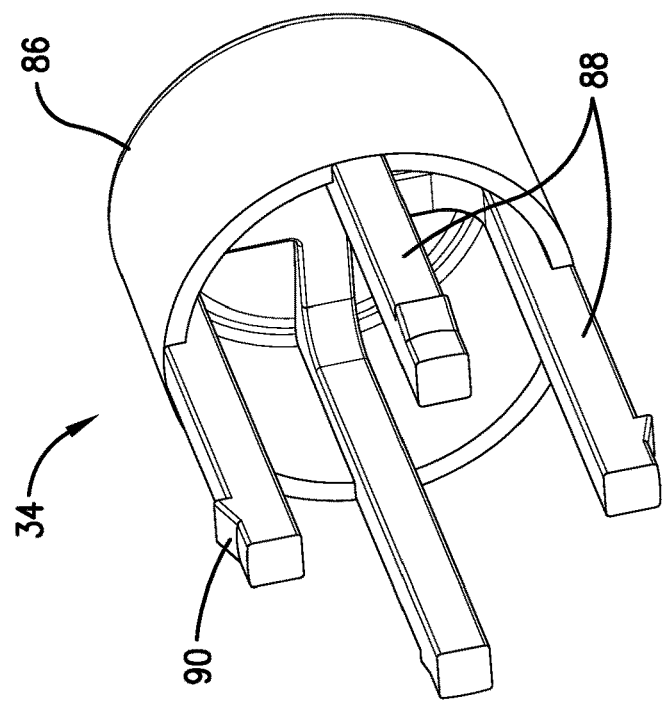
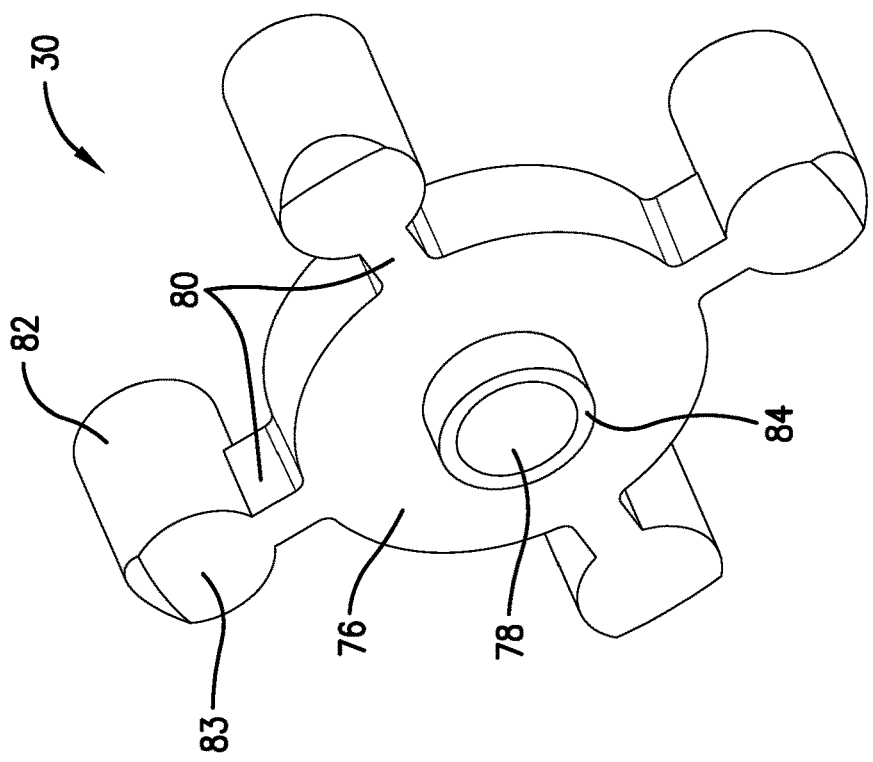

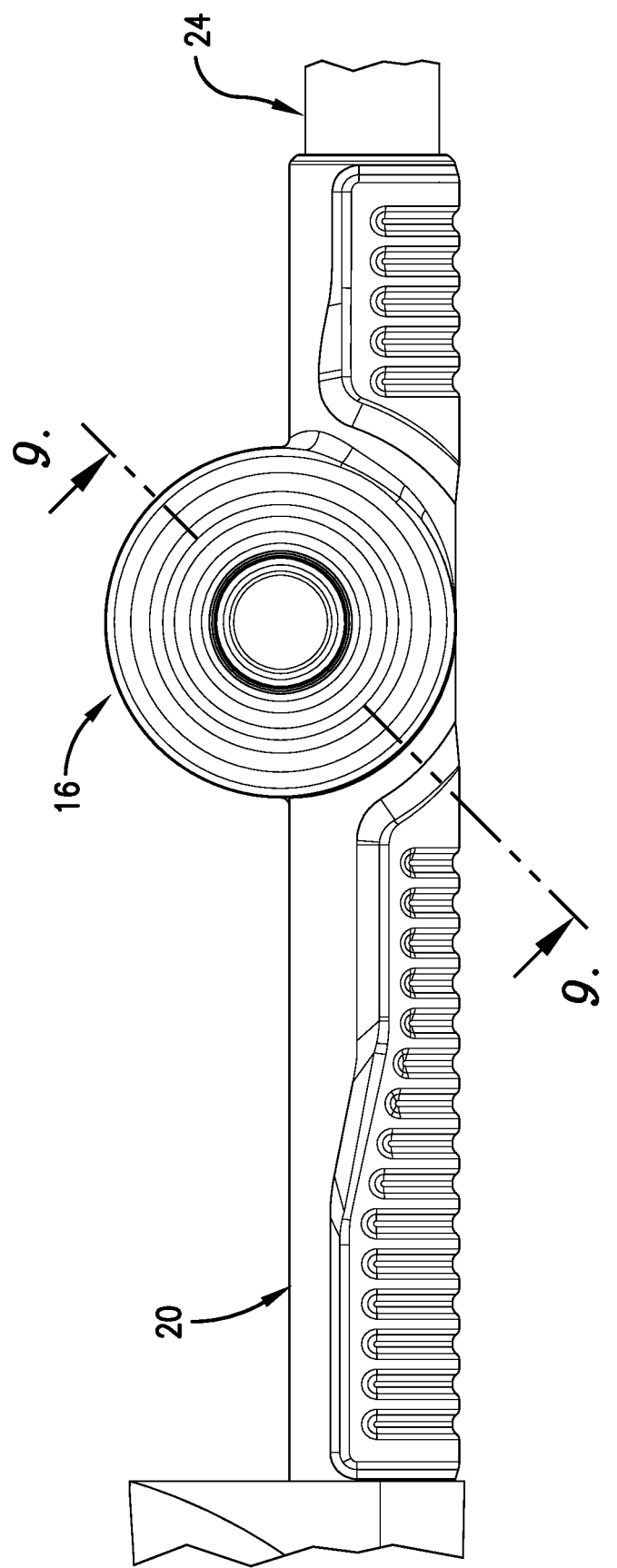

FOLDING SNOW SHOVEL WITH IMPROVED JOINT

BACKGROUND

Large tools, such as spades, shovels, rakes, snow shovels, or the like, are long, heavy, and unbalanced in terms of weight, which makes storing and transporting them difficult. They require a large space to be laid down or secured in an upright position, especially when there are multiple such tools in the same space. For example, storing a snow shovel in a vehicle for use in removing snow requires compartment space that can accommodate the length of the shovel, which is not possible or practical for many vehicles. Additionally, the lengths of many tools often make them difficult to use in cramped spaces, such as raking leaves or mulch under a deck or shoveling snow underneath a vehicle. Snow shovels and other tools with retractable handles have been developed, but many of those handles are too flimsy or are otherwise not suitable for many uses.

The background discussion is intended to provide information related to the present invention which is not necessarily prior art.

SUMMARY

The present invention solves the above-described problems and other problems by providing a tool with an improved joint that enables efficient storage and better access to spaces underneath large objects.

A tool constructed according to an embodiment of the invention comprises a first portion, a second portion, and a joint for connecting the first portion to the second portion. The first portion may include a snow shovel head, and the second portion may include a handle.

The joint comprises a first elongated portion, a second elongated portion, and a hub. The first elongated portion is configured to couple to the first portion of the tool and includes a first joint end. The second elongated portion is configured to couple to the second portion of the tool and includes a second joint end with a plurality of cavities formed therein.

The hub is positioned between the first joint end and the second joint end and is shiftable between a locked position and an unlocked position. The hub includes a projection that is operable to extend into one of the cavities when in the locked position and shift out of the cavities when in the unlocked position. The hub enables the first joint end and the second joint end to pivot relative to one another when in the unlocked position and hold an angle between the two ends when in the locked position. This allows a tool connected to the joint to fold for storage and to be used at an angle for accessing certain spaces, such as snow underneath a vehicle.

A shovel constructed according to an embodiment of the present invention includes a shovel blade, a shovel handle, and the joint above connecting the shovel blade to the shovel handle. The first elongated portion is connected to the shovel blade, and the second elongated portion is connected to the shovel handle. The joint enables the shovel blade and the shovel handle to pivot relative to one another.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 6 is a perspective view of a hub of the joint of FIG. 2;

FIG. 7 is a perspective view of an actuator of the joint of FIG. 2;

FIG. 8 is a side perspective view of the joint of FIG. 2;

Figure 1:
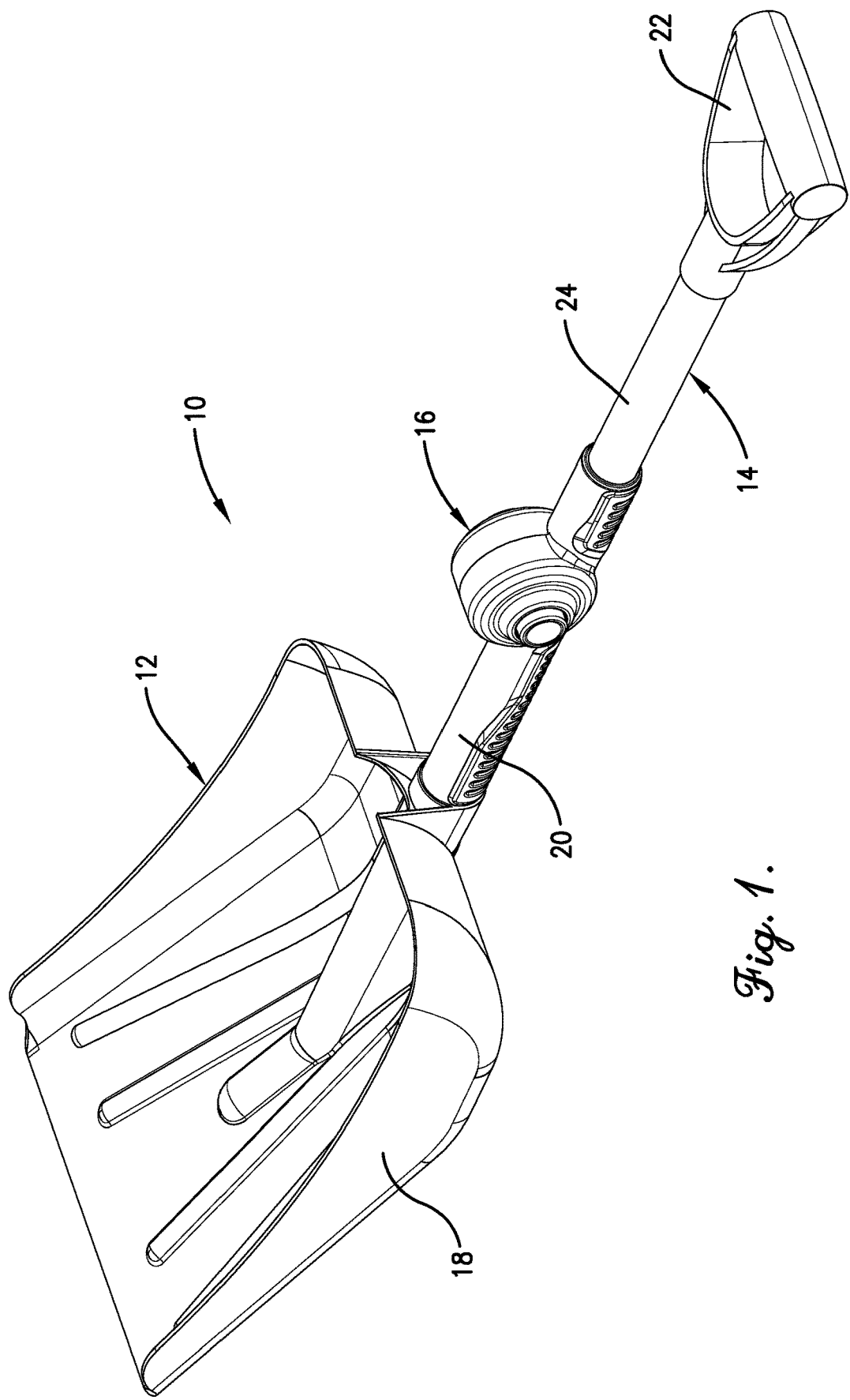
FIG. 1 is a perspective view of a shovel having a joint constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A tool 10 having a joint 16 constructed in accordance with an embodiment of the invention is illustrated in FIG. 1. The illustrated tool 10 is a snow shovel, but can be any other tool, such as a spade, rake, garden hoe, or the like. The tool 10 may comprise a first portion 12, a second portion 14, and a joint 16 for connecting the first and second portions 12, 14. The first portion 12 may be a tool portion, connected to the joint 16, and may comprise a head 18 and a first shaft 20. The head 18 may comprise a snow shovel head, spade head, rake head, garden hoe head, or the like. The first shaft 20 may comprise wood, metal, fiberglass, plastic, or the like.

The second portion 14 may be a handle portion and is also connected to the joint 16 and may comprise a handle 22 and a second shaft 24. The handle 22 is generally provided for gripping and may comprise wood, metal, fiberglass, plastic, or the like. The second shaft 24 may also comprise wood, metal, fiberglass, plastic, or the like.

Figure 2:
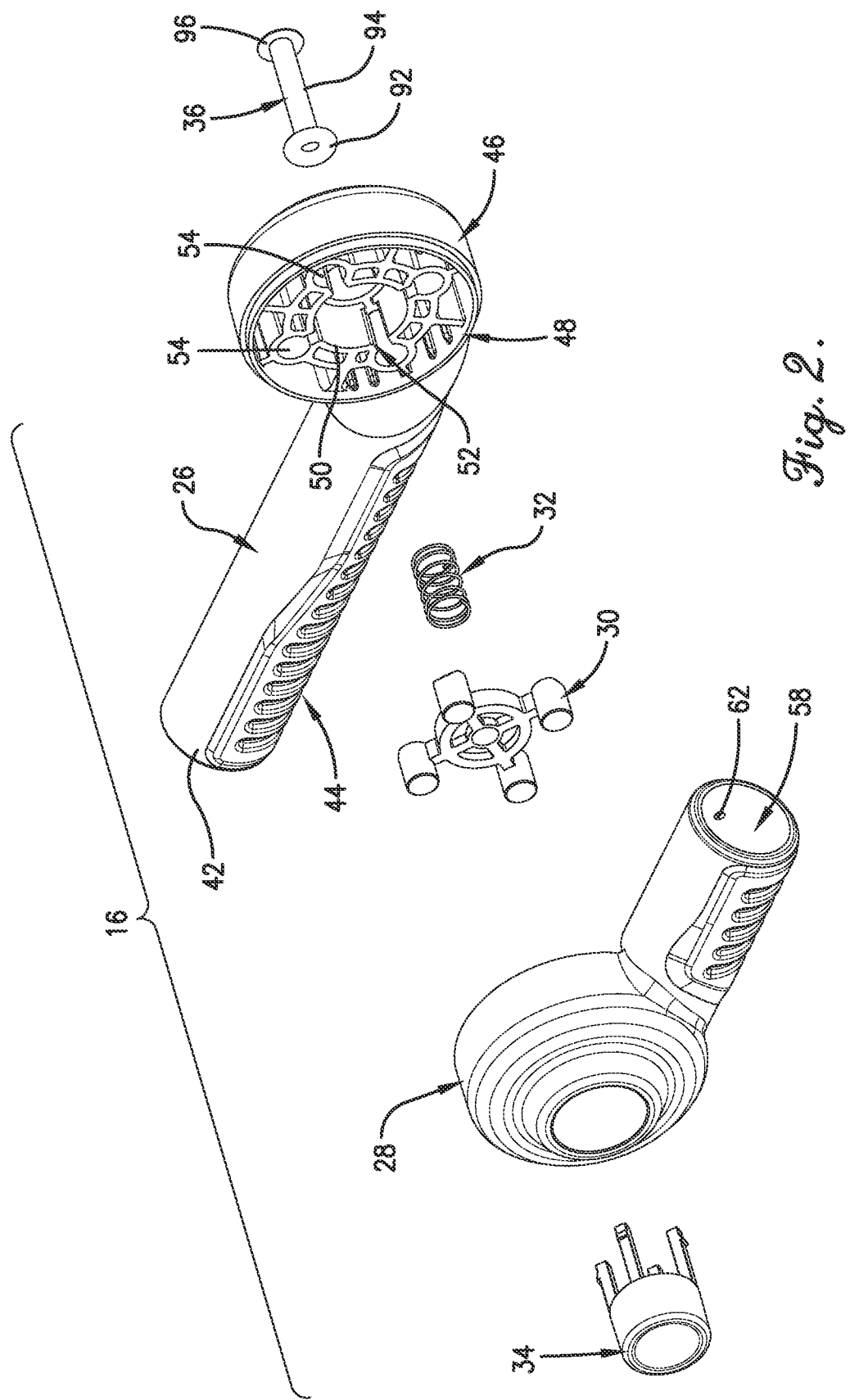
FIG. 2 is a first exploded view of the joint of the shovel of FIG. 1.
Figure 3:
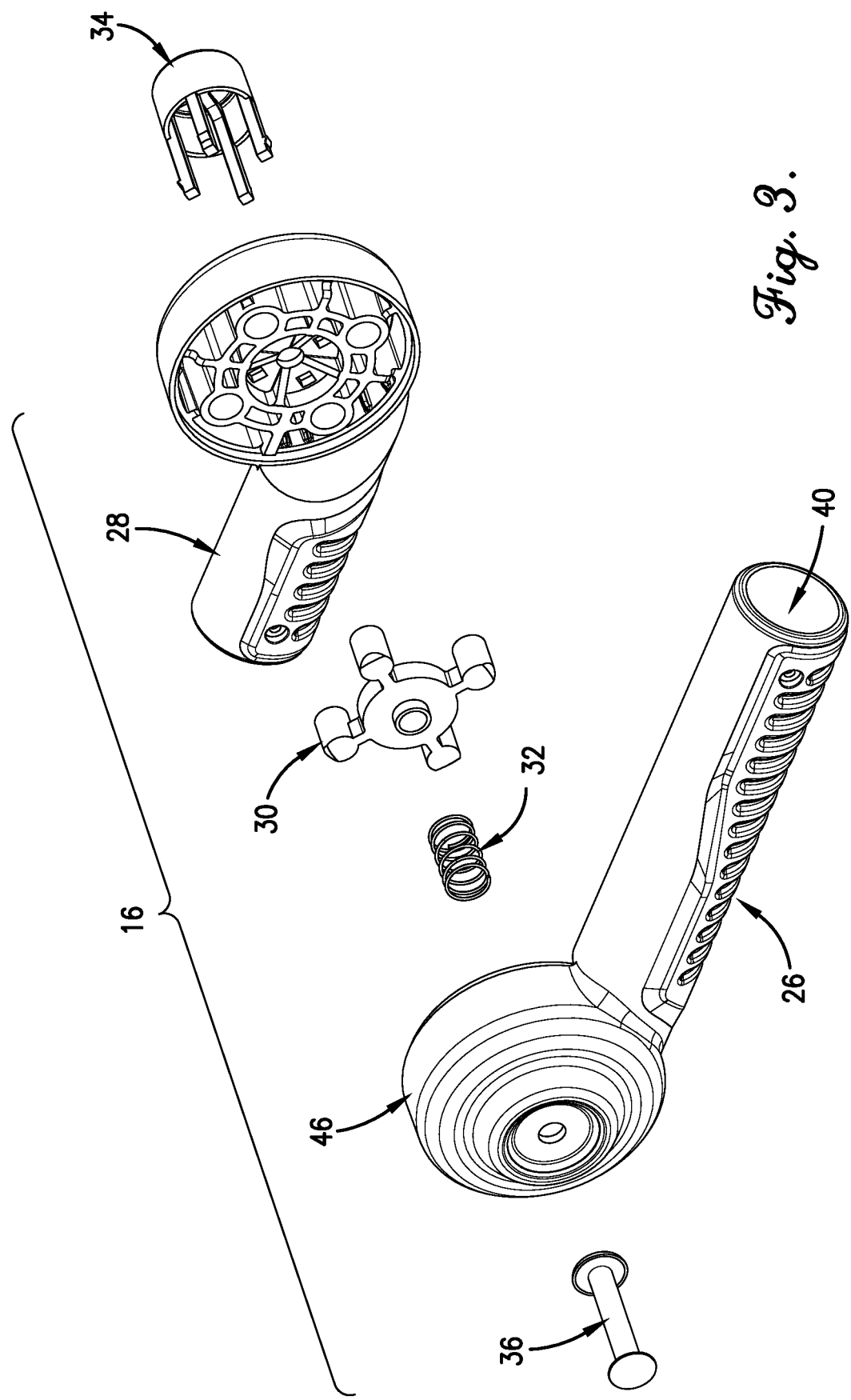
FIG. 3 is a second exploded view of the joint of the shovel of FIG. 1.
Figure 4:
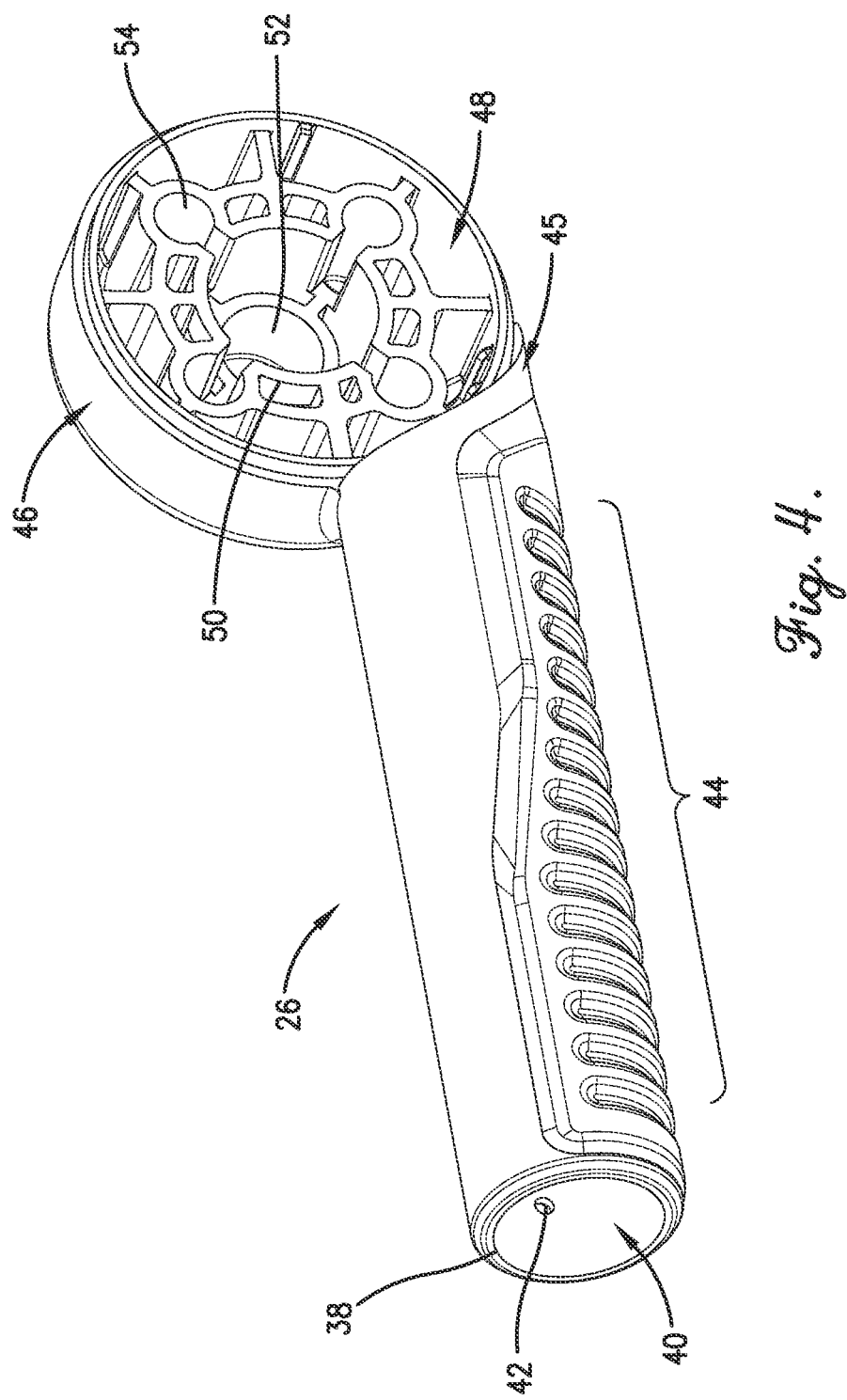
FIG. 4 is a perspective view of a first elongated portion of the joint of FIG. 2.

The joint 16 connects the tool portion 12 to the handle portion 14 so that they may pivot relative to one another. Turning to FIGS. 2-4, the joint 16 may comprise a first elongated portion 26, a second elongated portion 28, a hub 30, a biasing element 32, an actuator 34, and an axle member 36. The first elongated portion 26 is operable to couple to the tool portion 12 and pivot relative to the second elongated portion 28. In some embodiments, the first elongated portion 26 may comprise a socket 38 with a cavity 40 formed therein for receiving the first shaft 20 of the tool portion 12 and a hub housing portion 46. The socket 38 may include a hole 42 through which a fastener (not shown) may extend to secure the first shaft 20 to the first elongated portion 26. The first elongated portion 26 may also include a gripping region 44 disposed toward a bottom surface of the first elongated portion 26.

The hub housing portion 46 of the first elongated portion 26 may define an inner space 48 with a wall 50. The wall 50 may define a central cavity 52 for receiving the axle member 36 and a plurality of hub cavities 54 for receiving portions of the hub 30. The hub cavities 54 may be angularly spaced about the central cavity 52. In some embodiments, the hub cavities 54 are spaced about the central cavity 52 in ninety-degree increments.

Figure 5:
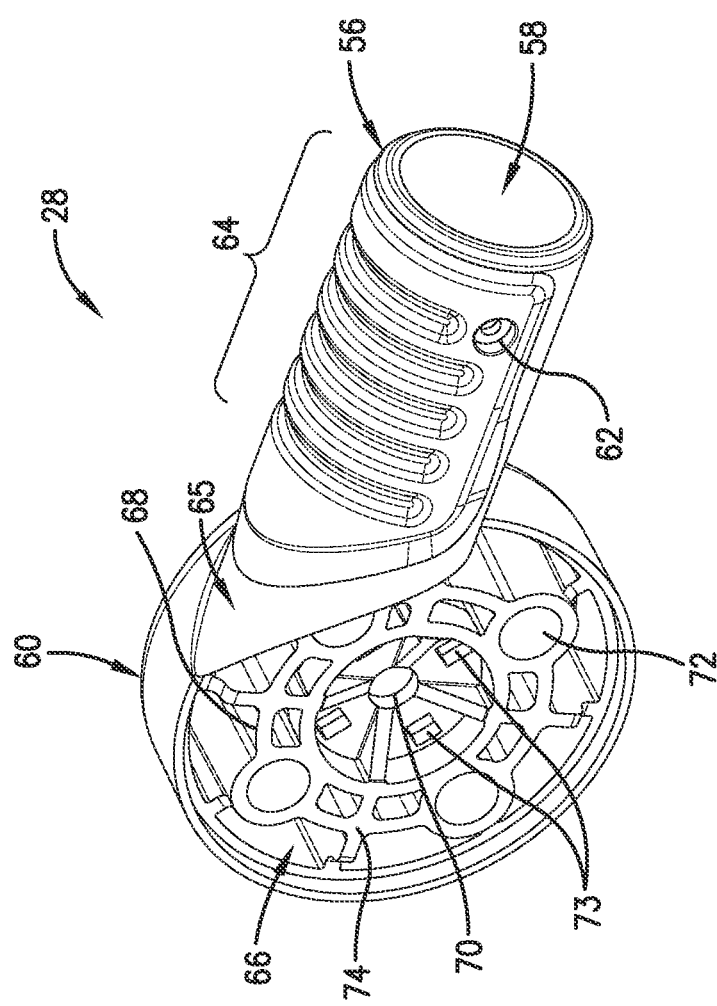
FIG. 5 is a perspective view of a second elongated portion of the joint of FIG. 2.

Turning to FIG. 5, the second elongated portion 28 is operable to couple to the handle portion 14 and pivot relative to the first elongated portion 26. The second elongated portion 28 may comprise a socket 56 with a cavity 58 formed therein for receiving the shaft 24 of the handle portion 14 and a hub housing portion 60. The socket 56 may include a hole 62 through which a fastener (not shown) may extend to secure the second shaft 24 to the second elongated portion 28. The second elongated portion 28 may also include a gripping region 64 disposed toward a top surface of the second elongated portion 28. The socket 56 may also include a transition surface 65 that transitions to the hub housing portion 60. The transition surface 65 is operable to move annularly along an exterior surface of the hub housing portion 46 of the first elongated portion 26. Likewise, the socket 38 of the first elongated portion 26 may include a transition surface 45 that is operable to move annularly along an exterior surface of the hub housing portion 60 of the second elongated portion 26.

In some embodiments, the first elongated portion 26 may be longer than the second elongated portion 28. Additionally, the elongated portions 26, 28 may connect with either the tool portion 12 or the handle portion 14 without departing from the scope of the present invention. For example, the shaft 20 of the tool portion 12 may be inserted into the cavity 58 of the socket 56 of the second elongated portion 28, and the shaft 24 of the handle portion 14 may be inserted into the cavity 40 of the socket 38 of the first elongated portion 26.

The hub housing portion 60 of the second elongated portion 28 may define an inner space 66 with a wall 68 that defines a central cavity 70 for receiving the axle member 36 and a plurality of hub cavities 72 for receiving portions of the hub 30. The wall 68 may also include one or more guide walls 74 against which portions of the hub 30 slide when the second elongated portion 28 pivots relative to the first elongated portion 26, as discussed in further detail below. The hub cavities 72 of the second elongated portion 28 may align with the hub cavities 54 of the first elongated portion 26 when the second elongated portion 28 is at certain angular positions relative to the first elongated portion 26. The hub cavities 72 may be angularly spaced about the central cavity 70. In some embodiments, the hub cavities 72 are spaced about the central cavity 70 in ninety-degree increments. In some embodiments, the hub cavities 72 may be spaced about the central cavity 70 at the same angular increments as the hub cavities 54 of the first elongated portion 26. In some embodiments, the hub housing portion 60 includes one or more pin holes 73 for allowing portions of the actuator 34 to extend into the inner space 66 and abut the hub 30, as discussed in further detail below.

The hub 30 is positioned between the first elongated portion 26 and the second elongated portion 28 and is shiftable between a locked position where the elongated portions 26, 28 are in a fixed position relative to one another and an unlocked position where the elongated portions 26, 28 can pivot relative to one another. Turning to FIG. 6, the hub 30 may comprise a central portion 76 with a hole 78 extending therethrough for receiving the axle member 36, a plurality of spokes 80, and a plurality of projections 82, 83. In some embodiments, the hub 30 may additionally include a wall 84 for maintaining the biasing element 32 in coaxial alignment with the hub 30. The plurality of spokes 80 may extend radially from the central portion 76, and the projections 82, 83 may extend axially from the spokes 80. The spokes 80 may be spaced about the central portion 76 in increments that match the hub cavities 54 of the first elongated portion 26 and/or the hub cavities 72 of the second elongated portion 28. For example, the spokes 80 may extend about the central portion 76 in ninety-degree increments. The hub 30 may comprise any shape without departing from the scope of the present invention. For example, the hub 30 may comprise a disc with the projections 82, 83 extending therefrom.

The projections 82, 83 may comprise dowel pins or other protrusions that extend axially from the spokes 80. In some embodiments, the projections 82 may extend axially from the spokes 80 toward the second elongated portion 28, and the projections 83 may extend axially from the spokes 80 toward the first elongated portion 26. The projections 83 may be longer than the projections 82. However, in some embodiments, the hub 30 may only comprise projections 82, such as in embodiments where the hub 30 is fixed to the first elongated portion 26. In some embodiments, the hub 30 may include spokes 80 designated for projections 82 and spokes 80 designated for projections 83. The spokes 80, the projections 82, 83, and/or the hub cavities 54, 72 may have any number of configurations without departing from the scope of the present invention.

The biasing element 32 is configured to bias the hub 30 in the locked position. The biasing element 32 may comprise a spring, or the like, that abuts the first elongated portion 26 and the hub 30. The biasing element 32 may press the hub 30 against the second elongated portion 28 so that the projections 82 of the hub 30 extend into the hub cavities 72 of the second elongated portion 28 while projections 83 remain engaged with the hub cavities 54 of the first elongated portion 26, thereby preventing pivoting between the elongated portions 26, 28. The biasing element 32 may be operable to be compressed so that the hub 30 shifts to the unlocked position whereby the protrusions 82 of the hub 30 exit the hub cavities 72 of the second elongated portion 28, thereby freeing the second elongated portion 28 to pivot relative to the first elongated portion 26 and the hub 30. The biasing element 32 may define a tunnel through which the axle member 36 extends. The biasing element 32 may be configured a number of ways without departing from the scope of the present invention. For example, the biasing element 32 may comprise a tension spring attached to the hub 30 and the second elongated portion 28 and be configured to pull the hub 30 toward the second elongated portion 28.

Turning to FIG. 7, the actuator 34 is configured to shift the hub 30 from the locked position to the unlocked position. The actuator 34 may comprise a button 86 and a plurality of pins 88. The pins 88 may be operable to be inserted into the pin holes 73 of the second elongated portion 28 and abut the hub 30. The pins 88 may comprise detent mechanisms 90 for securing the button 86 on the hub housing portion 60 of the second elongated portion 28.

The axle member 36 is configured to hold the first and second elongated portions 26, 28 in pivotal arrangement. The axle member 36 may comprise a first head 92, a shaft portion 94, and a second head 96. The shaft portion 94 may extend through the central cavity 52 of the first elongated portion 26, through the biasing member 32, through the central hole 78 of the hub 30, and through the central cavity 70 of the second elongated portion 28. The heads 92, 94 sandwich the first and second elongated portions 26, 28 together so that they can pivot relative to one another about the shaft portion 94. In some embodiments, the axel member 36 comprises a rivet.

Figure 10:
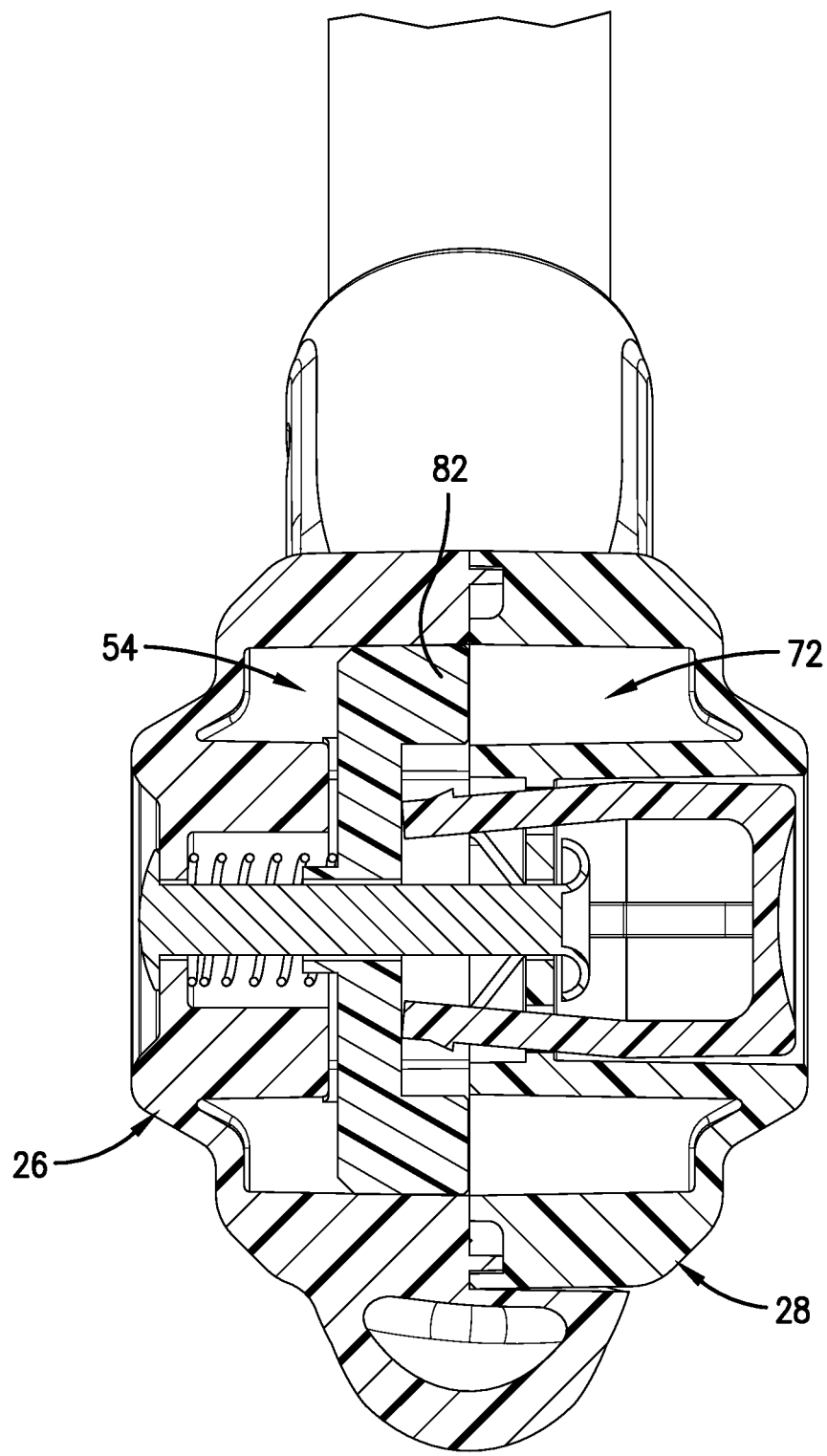
FIG. 10 is a section view of the joint of FIG. 9 with the actuator actuated.
Figure 11:
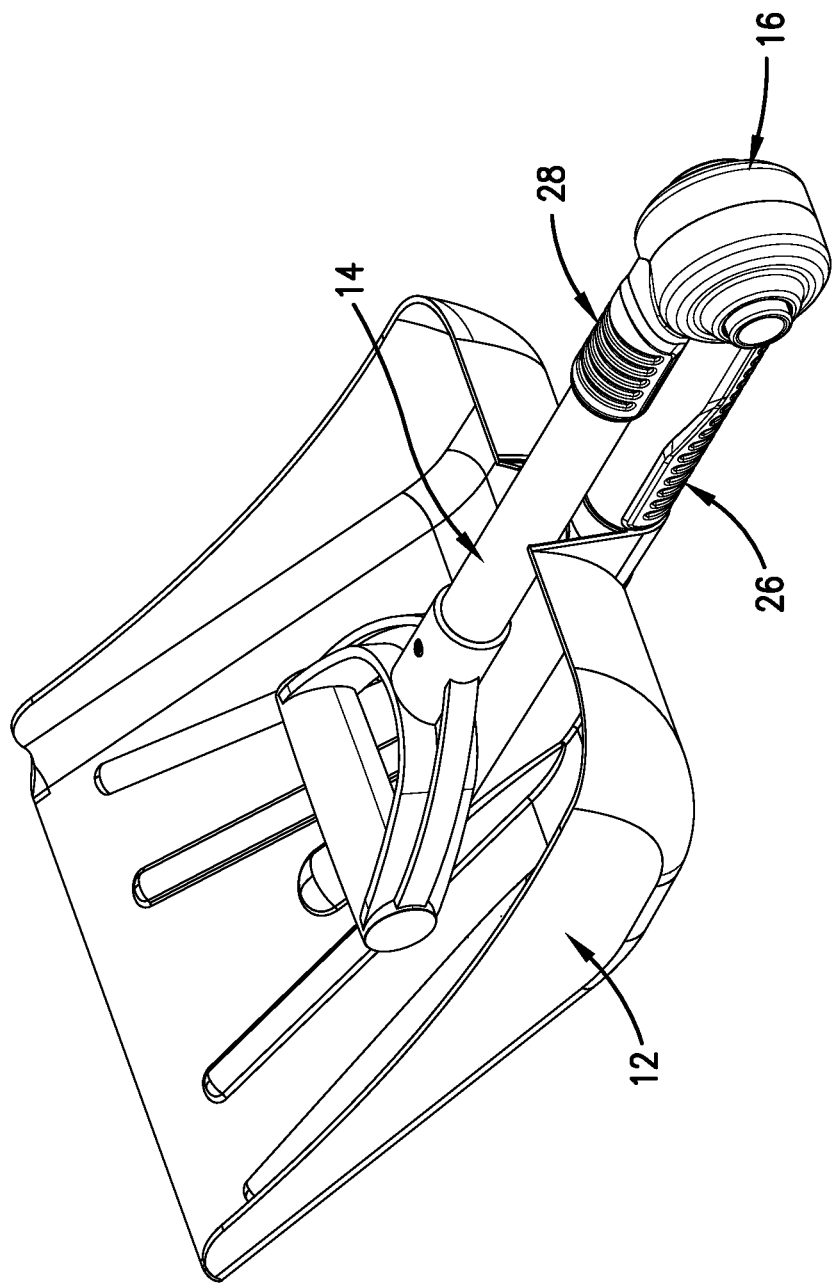
FIG. 11 is a perspective view of the shovel of FIG. 1 folded at a first angle.

An exemplary method of using the tool 10 will now be described. The tool 10 may be stored in the folded position as depicted in FIG. 11. In this configuration, the tool 10 can be easily stored in a compact space, such as the trunk of a vehicle. To pivot the second elongated portion 28 relative to the first elongated portion 26 for use, the button 86 of the actuator 34 may be pressed. The button 86 may be pressed so that the pins 88 of the actuator 34 push against the hub 30, compressing the biasing element 32, until the projections 82 exit the hub cavities 72 of the second elongated portion 28. When the projections 82 exit the hub cavities 72, the hub 30 is in the unlocked position, as depicted in FIG. 10. The second elongated portion 28 can then pivot relative to the first elongated portion 26.

Figure 9:
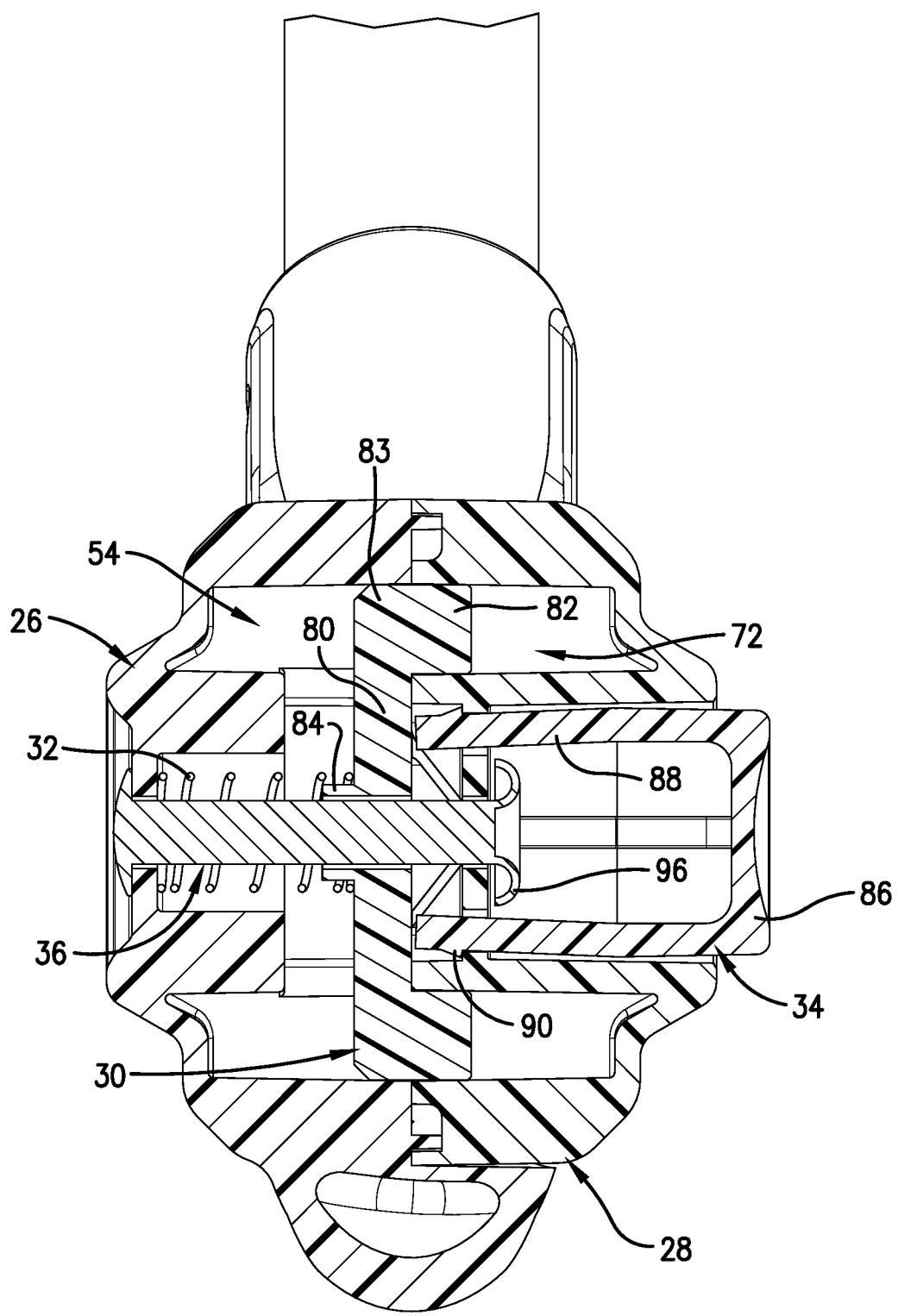
FIG. 9 is a sectional view of the joint along the line indicated in FIG. 8.

The actuator 34 may be held down so that the hub 30 remains in the unlocked position. With the actuator 34 pressed, the pins 88 keep the hub 30 in the unlocked position and revolve around the axle member 36 as the second elongated portion 28 is pivoted relative to the first elongated portion 26. The hub 30 may remain stationary relative to the first elongated portion 26 as the projections 83 are inside the hub cavities 54 of the first elongated portion 26. Once the elongated portions 26, 28 are at the desired angle, the button 86 may be released so that the hub 30 shifts back to the locked position with the projections 82 re-entering the hub cavities 72 of the second elongated portion 28 and the projection 83 remaining in the hub cavities 54 of the first elongated portion 26, as depicted in FIG. 9.

Figure 12:
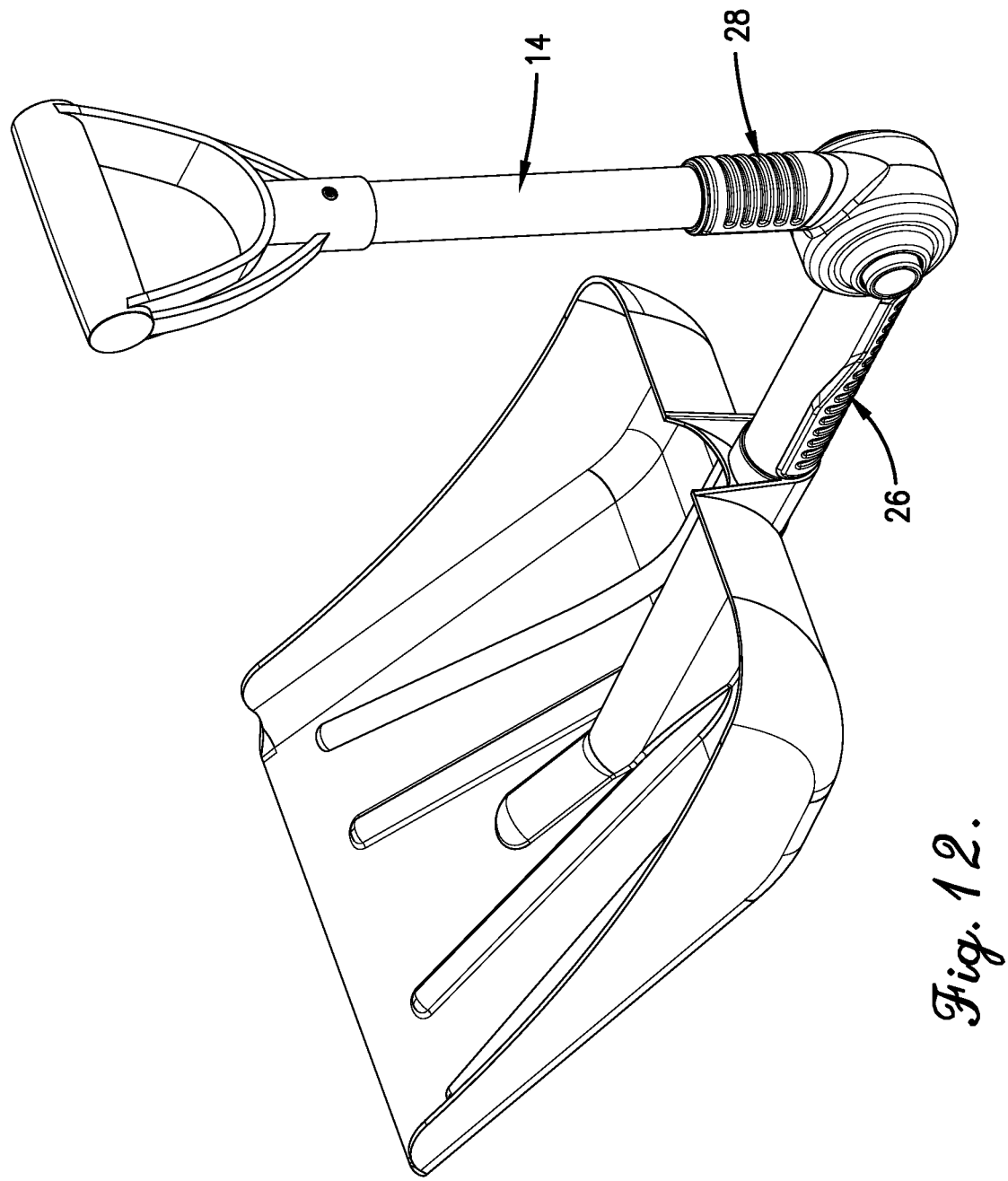
FIG. 12 is a perspective view of the shovel of FIG. 1 folded at a second angle.

The actuator 34 may alternatively be released when pivoting the second elongated portion 28. The button 86 of the actuator 34 may be held down, and the second elongated portion 28 may be pivoted slightly so that the projections 82 abut the guide wall 74 of the second elongated portion 28. That way, when the button 86 is released, the second elongated portion 28 can still be pivoted relative to the first elongated portion 26 with the projections 82 pressed against the guide wall 74 via the biasing element 32. The projections 82 can slide along the guide wall 74 until the hub cavities 72 of the second elongated portion 28 are aligned with the projections 82 so that the projections 82 re-enter the hub cavities 72 of the second elongated portion 28, such as at a ninety-degree angle, as depicted in FIG. 12. When the projections 82 align with and enter the hub cavities 72 of the second elongated portion 28, the biasing member 32 causes the hub 30 to automatically shift back to the locked position with the projections 82 re-entering the hub cavities 72 of the second elongated portion 28 and the projections 83 remaining in the hub cavities 54 of the first elongated portion 26. This fixes the angle between the first elongated portion 26 and the second elongated portion 28.

Figure 13:
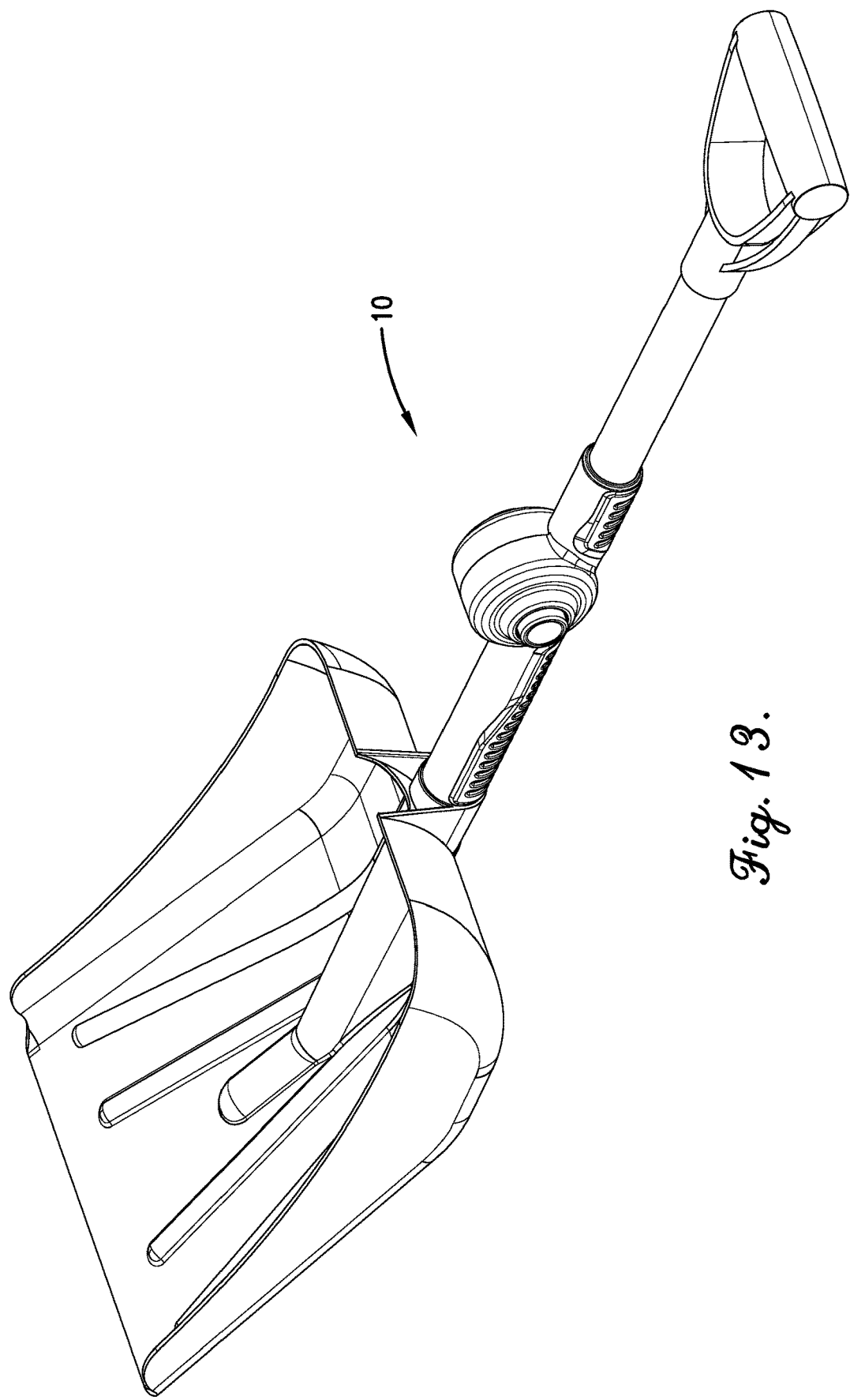
FIG. 13 is a perspective view of the shovel of FIG. 1 in an extended position.

In the configuration depicted in FIG. 12, the tool 10 is especially useful for accessing snow underneath a vehicle, which often needs to be removed to help free a vehicle stuck in the snow. When the tool portion 12 comprises a rake head instead of the snow shovel, this configuration is also useful for accessing leaves, mulch, rocks, or yard waste underneath a deck, or the like. The actuator 34 can then be pressed again and the second elongated portion 28 pivoted until the second elongated portion 28 is fully extended, as depicted in FIG. 13. To store the tool 10, the button 86 may be pressed and the second elongated portion 28 pivoted back to the folded position depicted in FIG. 11.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A joint connecting a first portion of a tool to a second portion of the tool, the joint comprising:
   a first elongated portion configured to couple to the first portion of the tool and including a first joint end;
   a second elongated portion configured to couple to the second portion of the tool and including a second joint end with a plurality of cavities formed therein; and
   a hub positioned between the first joint end and the second joint end and shiftable between a locked position and an unlocked position, the hub comprising a projection that is operable to—
      extend into one of the plurality of cavities when in the locked position, and
      shift out of the plurality of cavities when in the unlocked position,
   wherein the hub comprises a central portion and a radially extending spoke, and the projection extends axially from the spoke.

2. The joint of claim 1, further comprising a biasing element configured to bias the hub in the locked position.

3. The joint of claim 1, further comprising an actuator configured to shift the hub to the unlocked position.

4. The joint of claim 3, wherein the second joint end comprises a plurality of pin holes, and the actuator comprises a button with a plurality of pins extending through the plurality of pin holes and abutting the hub.

5. The joint of claim 4, wherein the plurality of pins of the actuator comprise detent mechanisms that secure the button to the second joint end.

6. The joint of claim 1, further comprising a rivet extending through the first joint end, the hub, and the second joint end.

7. The joint of claim 1, wherein the first elongated portion comprises a socket that receives the first portion of the tool.

8. The joint of claim 1, wherein the second joint end includes a center, and the plurality of cavities are angularly spaced about the center in 90-degree increments.

9. The joint of claim 1, wherein—
the plurality of cavities formed in the second joint end is a second plurality of cavities,
the projection of the hub is a first projection,
the first joint end comprises a first plurality of cavities, and
the hub includes a second projection extending in an opposite axial direction as the first projection and into one of the first plurality of cavities.

10. A joint connecting a first portion of a tool to a second portion of the tool, the joint comprising:
a first elongated portion configured to couple to the first portion of the tool and including a first joint end with a first plurality of cavities formed therein;
a second elongated portion configured to couple to the second portion of the tool and including a second joint end with a second plurality of cavities formed therein that are operable to be aligned with the first plurality of cavities when the second joint end opposes the first joint end;
a hub positioned between the first joint end and the second joint end and shiftable between a locked position and an unlocked position, the hub comprising a plurality of dowel pins that are operable to extend into the first plurality of cavities and the second plurality of cavities when in the locked position and shift out of the second plurality of cavities when in the unlocked position;
a biasing element configured to bias the hub in the locked position; and
an actuator configured to shift the hub to the unlocked position.

11. The joint of claim 10, wherein the second joint end includes a center, and the second plurality of cavities are angularly spaced about the center in 90-degree increments.

12. The joint of claim 10, wherein the hub comprises a central portion and radially extending spokes, and the plurality of dowel pins extend axially from the spokes.

13. The joint of claim 10, wherein the first elongated portion comprises a first socket that receives the first portion of the tool, and the second elongated portion comprises a second socket that receives the second portion of the tool.

14. A shovel comprising:
a shovel blade;
a shovel handle;
a joint connecting the shovel blade to the shovel handle, the joint comprising:
a first elongated portion configured to couple to the shovel blade and including a first joint end;
a second elongated portion configured to couple to the shovel handle and including a second joint end with a plurality of cavities formed therein; and
a hub positioned between the first joint end and the second joint end and shiftable between a locked position and an unlocked position, the hub comprising a projection that is operable to—
extend into one of the plurality of cavities when in the locked position, and
shift out of the plurality of cavities when in the unlocked position,
wherein the hub comprises a central portion and a radially extending spoke, and the projection extends axially from the spoke.

15. The shovel of claim 14, wherein the joint further comprises a rivet extending through the first joint end, the hub, and the second joint end.

16. The shovel of claim 14, wherein the first elongated portion comprises a socket that receives a portion of the shovel blade.

17. The shovel of claim 14, wherein the second joint end comprises a plurality of pin holes, further comprising an actuator having a button with a plurality of pins extending through the plurality of pin holes and abutting the hub.

18. The shovel of claim 17, wherein the plurality of pins of the actuator comprise detent mechanisms that secure the button to the second joint end.

* * * * *